UNITED STATES PATENT OFFICE 2,490,660

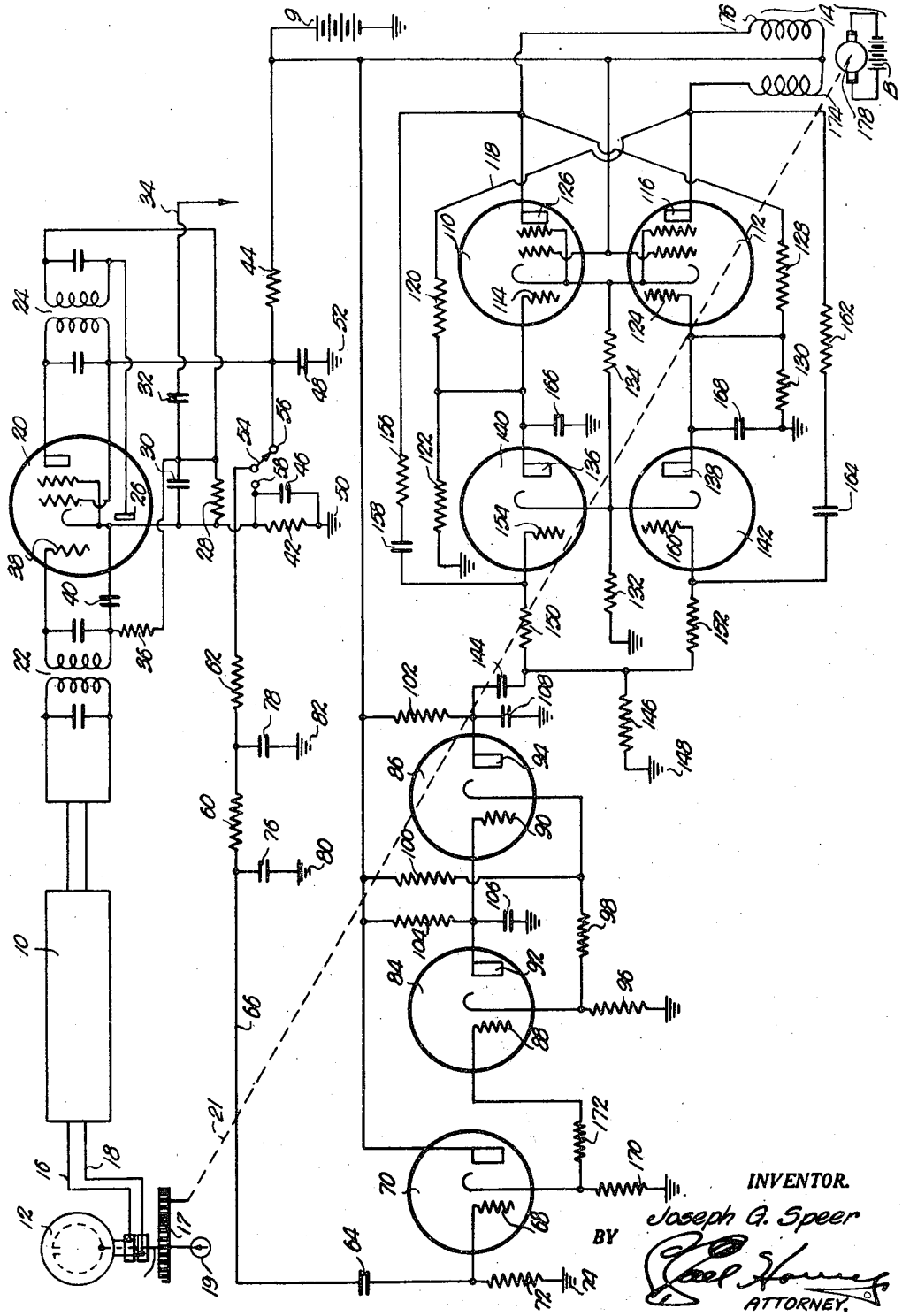

RADIO DIRECTION FINDER

Joseph G. Speer, Merriam, Kans., assignor of one-half to H. G. Koenig, Merriam, Kans.

Application November 4, 1946, Serial No. 707,696

14 Claims. (Cl. 343—117)

This invention relates to the art of radio and more specifically to radio receiving devices for determining the direction of incoming radio waves, the primary aim whereof is to provide a radio direction finder particularly adapted for use on aircraft, ships and other mobile structures through the ability of the direction finder to automatically indicate the direction of arrival of the incoming signal relative to the heading of the aircraft or ship.

Radio direction finders have heretofore been of two general types, namely, that commonly known as the aural null type and the radio compass. The first type embodied the most simple circuit features, comprising a conventional radio receiver having a directional antenna, usually consisting of a loop suitably balanced and shielded to minimize non-directional pickup.

This type of antenna produced a signal at the input of the receiver, that was proportional to the sine of the angle of rotation from the direction of arrival of the incoming radio wave. As this antenna was rotated through 360° of azimuth the operator would find two points 180° apart at which the signal would vanish. The bearing of the radio station was thus determined as one of these two points. It was found that this 180° ambiguity could be resolved by combining a signal from a non-directional antenna with the directional antenna signal and observing that on one side of the two nulls the signal was stronger than on the other. This was because the signal phase of the non-directional antenna was constant while the signal phase of the directional antenna shifted 180° as each null was crossed. In this method the non-directional antenna is commonly referred to as a sense antenna.

The compass type of radio direction finder requires a directional and a sense antenna, both of which are continuously connected to the compass radio receiver. In one form the directional antenna is rotated manually and a visual indicating device shows whether the indicated bearing is to the right or left of the actual bearing. In the other form the directional antenna is automatically rotated so as to continuously indicate the true bearing.

The 180° ambiguity in bearings observed in the aural null type of direction finder without a sense antenna is of course undesirable. It is not a serious defect, however, as the operator usually knows the approximate bearing to be expected and if not can resolve the uncertainty by observing the direction of the change in bearing with time. A more serious objection is the fact that the ear is insensitive to small changes in signal strength. Therefore, when operating near the null the static and other background noises together with interference from undesired radio stations, particularly those differing in bearing approximately 90° tend to obscure the null. Experience has shown that accurate bearings can be obtained only when the radio field strength is quite high. A bearing uncertainty of 15° to 20° is not uncommon when the field strength is still sufficient to give reliable communication. Another serious objection to the aural null type of direction finder is its operating inconvenience. The manual rotation of the antenna with the repeated rocking across the null required for bearing determination is tedious and time consuming. This is particularly objectionable in aircraft where the pilot must devote most of his attention to the operation of the aircraft. Furthermore, the high operating speed of aircraft does not permit any appreciable time to take bearings when maneuvering near a radio station. In addition, aural indications are much less satisfactory than visual indications particularly where considerable noise exists as in aircraft.

The methods through which the functions of the compass type of direction finder are accomplished require quite complicated electronic circuits with critical adjustments. This results in costly, heavy and bulky equipment and the complexity and multiplicity of circuits greatly increases service and maintenance problems and likewise results in more frequent operational failures in service. The radio compass does eliminate the faults of the aural null direction finder, but not without introducing some new faults peculiarly its own. In addition to bearing errors caused by faulty design or maintenance a serious error is frequently introduced by an undesired radio station operating on a nearby frequency particularly when the undesired station differs in bearing by approximately 90°. This error may be experienced in spite of a high degree of selectivity by virtue of frequency discrimination, because this discrimination ratio may not exceed the signal ratio resulting when the desired signal is received with the directional antenna near the null position and the undesired signal with the antenna near the maximum position.

The most important object of this invention, therefore, is to provide a radio direction finder that eliminates or at least greatly minimizes virtually all the faults and disadvantages inherent in the above-described, conventional types of such devices, through the employment of a receiver having as a part thereof, circuit elements responsive to the rate of change in the incoming signal strength as an antenna therefor rotates, for controlling the rotation thereof as veering of the aircraft or the like tends to affect the operation of said antenna.

One of the most important objects of this invention is to provide a radio direction finder having means for receiving an incoming signal and amplifying and detecting the same to produce an aural signal and including a rotatable directional antenna having circuit elements actuated by the carrier signal in response to the rate of change in signal strength as the operation of the antenna is affected by movement of its mobile support.

An important object of this invention is to provide in a radio direction finder having the aforesaid rotatable directional antenna and the incoming signal receiving system as a part thereof, of a reversible electric motor for actuating the antenna, the direction of travel of said motor and resultant direction of rotation of said antenna being controlled by circuit elements actuated by the carrier frequency voltage that has been rectified by said receiver, and responsive only to the rate of change in the amplitude of the incoming signal caused by deviation in positions of the antenna through movement of its supporting structure and rotation of the antenna by its motivating means.

Further objects of this invention are to provide a radio direction finder having circuit elements for controlling the direction of rotation of a directional antenna, which elements are actuated by the rectified carrier frequency voltage and operable only upon application thereto of a changing voltage; to provide means to cause such changing voltage to be applied thereto upon each change of signal amplitude dependent only upon the rate of speed and direction at which such change occurs, and irrespective of the direction of rotation of the antenna; and to provide means for selectively rendering said circuit operable through either an increase or decrease in signal amplitude.

A still further object of this invention is to provide a radio direction finder having a pair of trigger circuits, each comprising a plurality of vacuum tubes, said tubes in one circuit being so connected as to operate only upon being subjected to a changing rectified carrier voltage from the radio receiver, and the tubes of the other circuit being connected to operate only after the charging potential of the first circuit reaches a predetermined threshold level.

Another object of this invention is to provide in a radio direction finder having the aforesaid trigger circuits, means for connecting the tubes of the last mentioned circuit whereby the direction of travel of an electric motor is changeable to rotate the antenna in response to alternate conduction of respective tubes in said last mentioned circuit.

Other objects will be made clear or become apparent during the course of the following specification, referring to the accompanying drawing showing a diagrammatical view of the electric circuit forming a part of the radio direction finder, made in accordance with my present invention, and showing schematically the antenna, motor, radio receiver, and associated parts thereof.

The radio direction finder chosen for illustration and about to be described requires the use of a radio receiver 10 of the conventional type having any suitable source of power 9, capable of receiving, amplifying and detecting an incoming signal from a directional antenna 12 for the production of an aural signal. The specific form of antenna 12 forms no part of this invention and, therefore, has not been shown except schematically in the drawing. A simple loop antenna or any other form of directional antenna may well be used with the elements about to be described. This directional antenna 12 is of the rotating type of the kind and well known in this art. It is actuated by a motor 14 in a manner hereinafter more fully set forth. It is contemplated that antenna 12 be supported upon a vertical shaft 15 and have suitable reduction gearing 17 interposed between the shaft 15 and a shaft 21 for motor 14, illustrated diagrammatically to obtain the desired speed of rotation or oscillation as the case may be, and an azimuth dial 19 of conventional character, operated by shaft 15. Lead wires 16 and 18 interconnect antenna 12 and receiver 10 in the usual manner.

In addition to the element within receiver 10 for amplifying, the incoming signal receiver from the directional antenna 12 to the desired magnitude, a single stage of amplification of such signal takes the form of a vacuum tube 20. This stage of radio frequency or intermediate frequency amplification, has associated therewith a pair of transformers 22 and 24. The output of this stage is rectified by a diode 26, forming a part of tube 20, to the end that the rectified carrier voltage appears across resistor 28. A condenser 30 of low value is utilized to bypass the high frequency carrier components but has sufficient value to retain the low frequency components of the rectified carrier frequency voltage. A condenser 32 couples these low frequency components to an audio amplifier (not shown) through the medium of wire 34, which amplifier is arranged to provide audible reception of the signal.

The rectified carrier voltage resulting through use of diode 26 is applied through a resistor 36 to the grid 38 of vacuum tube 20.

The presence of this voltage at the grid 38 causes the cathode current of tube 20 to decrease in direct proportion to the strength of the incoming signal. This results in a decrease in cathode potential by virtue of the decreased drop across a resistance 42. Similarly this proportionate decrease in cathode current in tube 20 results in an increase in the plate and screen potential applied to the tube 20 because of a decreased drop across a resistor 44. A pair of condensers 46 and 48 grounded as at 50 and 52 respectively contribute additional attenuation to noise and signal voltages without appreciably delaying the rate of change of voltage caused by change in carrier signal strength as hereinafter more fully described.

Satisfactory aural reception and tuning of the receiver may be accomplished through manual manipulation of operating switch 54, having contact points 56 and 58. When this switch 54 is moved in closing relation with contact 56, as shown in the drawing, an increasing carrier signal emanating from antenna 12 will cause an increasing voltage to be applied through resistors 60 and 62. Such increasing voltage will also be applied to a condenser 64 through the medium of wire 63 interconnecting resistors 60 and 62 and condenser 64 and to grid 68 of a vacuum tube 70, as well as to a resistor 72, grounded as at 74.

Likewise, when this switch 54 is moved to a position closing contact 58, which is disposed on the cathode side of resistance 42, a rising voltage will be obtained as the carrier signal is decreased through oscillation of the directional antenna 12. Resistor 60 and 62, together with a pair of condensers 76 and 78, grounded as at 80 and 82 respectively, serve to additionally attenuate the audio and noise signals without seriously delaying application of the rising voltage to condenser 64.

It is obvious that as long as rising voltage is applied to condenser 64, there is charging current flowing through resistor 72 and causing positive voltage to be applied to grid 68 of tube 70.

Operably connected with the vacuum tube 70 is a trigger circuit having as a part thereof a pair of vacuum tubes 84 and 86. This connection is such that a positive voltage appearing at the grid 68 of tube 70 is carried through to grid 88 of tube 84. The current of a plate 92 of tube 84 is normally extinguished and the current of plate 94 of tube 86 is at saturation as determined by resistors 96 and 98 associated with tube 84 and resistors 100 and 102 associated with tube 86 respectively. When a positive potential applied to grid 88 of tube 84 reaches a certain threshold value, the current within tube 85 will extinguish and the current in tube 84 will reach saturation as determined by a resistance 104. This triggering operation is independent of the amplitude of the applied positive voltage above the threshold level or of its rate of rise.

This triggering operation will result in a sharp fixed increase in potential at the plate 94 of tube 86 after the rising potential at tube 84 reaches a certain threshold level. This increase in potential at tube 86 will continue until the voltage at tube 84 falls below the threshold value, at which time the potential at tube 86 will fall rapidly to normal.

Another trigger circuit is formed by means of a pair of vacuum tubes 110 and 112. The grid 114 of tube 110 is connected to plate 116 of tube 112 through the medium of wire 118 within which wire is disposed a potentiometer comprising resistors 120 and 122. Similarly grid 124 of tube 112 is connected to plate 126 of tube 110 by a potentiometer comprising resistors 128 and 130. These resistors are large in value so as to impose a negligible load on the plate circuits. The voltage amplification of tubes 110 and 112 exceeds the ratio:

$$\frac{\text{Resistor 120 plus resistor 122}}{\text{Resistor 122}}$$

or $$\frac{\text{Resistor 128 plus resistor 130}}{\text{Resistor 130}}$$

The cathodes of tubes 110 and 112 are positively biased by means of resistors 132 and 134 to a value equal to the maximum grid potential of either tube 110 or 112. The magnitudes of the resistors 132 and 134 are adjusted so that if either tube 110 or 112 draws plate current, it will hold the plate current in the remaining tube extinguished. The grids 114 and 124 of tubes 110 and 112 respectively are directly coupled to plates 136 and 138 of a pair of vacuum tubes 140 and 142 respectively. The plate currents of tubes 140 and 142 are normally extinguished by reason of the cathode bias produced by the resistor 132.

The trigger action is as follows: Assuming that tube 110 is conducting and that tube 112 is extinguished, a higher potential will exist on the plate 116 of tube 112 than on the plate 126 of tube 110. This causes a higher potential at the grid 114 of tube 110 and plate 136 of tube 140 than at the grid 124 of tube 112 and the plate 138 of tube 142. Therefore, the original current conditions are maintained.

When a sudden rise in voltage occurs at the plate 94 of tube 86, the condenser 144 charges through a resistor 146 grounded at 148. This applies a positive potential to the grids 154 and 160 of tubes 140 and 142 respectively through a pair of resistors 150 and 152. Tube 140, having the higher plate voltage, will begin to draw current first, thus reducing the grid voltage and hence plate current of tube 110. The plate voltage of tube 110 then rises, causing the grid voltage of tube 112, and, therefore, its plate current to rise. The rise of plate current in tube 112 causes a decrease in plate potential in this tube 112 and, therefore, a further decrease in grid potential of tube 110, which accentuates the change.

The plate 126 of tube 110 is coupled to grid 154 of tube 140 through a resistor 156 and a condenser 158, whereupon a rising plate voltage in tube 110 reinforces the triggering impulse. Likewise, the plate 116 of tube 112 is connected to grid 160 of tube 142 through a resistor 162 and a condenser 164 to the end that a falling plate voltage in tube 112 opposes the triggering impulse and prevents tube 142 from drawing plate current.

Condensers 158 and 164 are of sufficiently large capacity as to maintain feedback voltages at the grids 154 and 160 of tubes 140 and 142 respectively until triggering is completed and the charging current through condenser 144 has dropped to a low value. If condensers 158 and 164 are too small in capacity or condenser 144 is too large in capacity, a feedback voltage will cease before the triggering impulse ceases so that the tubes 110 and 112 in combination may trigger back and forth several times on one impulse. It is essential, however, that only one triggering action take place on each positive impulse, therefore, values of the condensers must be chosen accordingly. In choosing time constants for these trigger circuits, it is essential that they be fast in relation to the required frequency of triggering impulses. If the antenna 12 is rotated at a speed between 30 and 60 degrees per second and the oscillations about the null in the incoming signal are limited to 5° or 6°, not over 10 impulses per second will be required. Wide latitudes in time constants are permissible but the following are suitable and indicate the progressive change that is desirable:

Condenser 108 may be selected to give with resistor 102 a time constant of approximately .001 second. Condenser 144 may be selected to give with resistor 146 a time constant of approximately .005 of a second. Resistor 146 should be several times as large in value as resistor 102 so as not to impose a severe additional load on the vacuum tube 86. Resistors 150 and 152 may be approximately equal to resistor 146. Resistors 156 and 162 are of a magnitude to limit the feedback voltage to a value slightly greater than the triggering impulse voltage cross resistor 143. Condenser 158 together with resistor 150 and resistor 156 may have a time constant of approximately .02 of a second. Condenser 164, resistor 152 and resistor 162 are respectively equal to condenser 158, resistor 150 and resistor 156. Condenser 106 and a pair of condensers 166 and 168 are small in capacity so as to have a negligible effect on the triggering operation. Their presence is desirable as the overall amplification is considerable and at high audio frequencies the electrostatic feedback through the wiring will generally be enough to cause oscillations of the trigger circuits and thus prevent their proper operations.

Likewise, the trigger circuit (tubes 84 and 86) could be omitted entirely except for the fact that multi-triggering in tubes 110 and 112 might be experienced if the rate of change of the signal emanating from antenna 12 were too low. Multi-triggering may also result if tube 70 were omitted and condenser 64 connected directly to grid 88 of tube 84. In this case a small signal will drive the grid positive and the grid current would effectively shunt resistor 72 to a low value, causing condenser 64 to charge very rapidly. A small fluctuation in the rate of change of the signal caused by noise or audio signal or non-linearity of the detector could cause the grid to drop below the threshold value and then rise again, giving multi-triggering. By using vacuum tube 70, as shown, it is impossible to drive the grid positive as the cathode rises almost as rapidly as the grid, due to using a resistance 170 having a large value. An additional resistor 172 is included in order to limit the grid current of tube 84 to a low value so as to not disturb the plate current of either tube 70 or 84.

The numerals 174 and 176 designate a pair of field windings for the motor 14, which has been illustrated as comprising a small D. C. motor. The armature 178 of motor 14 is continuously energized from a primary power source B. Field 176 is energized when the tube 110 is conducting and field 174 receives energization when tube 112 is conducting. Fields 173 and 174 are so connected that the motor 14 reverses and runs in opposite direction as energy is transferred from one field to the other. This motor 14 should be of slow speed so that it will reverse rapidly and thereby quickly change the direction of movement of antenna 12 through the medium of interconnecting reduction gearing 17.

The manually operable switch 54 is employed to select either of two modes of operation.

The first mode of operation, is obtained with the switch 54 connected to point 56 as shown. In this case an increasing signal strength will cause an increasing voltage to be applied to the trigger circuits causing them to function and thereby reverse the motor 14 rotating the antenna 12. Reversal of the direction of rotation of the antenna 12 will cause the previously increasing signal strength to decrease. The decreasing signal strength permits the trigger circuit to restore to normal condition in preparation for subsequent triggering impulses.

After the direction of rotation of the directional antenna 12 has been once reversed rotation will continue until the antenna 12 is rotated to a position of minimum receptivity. Continued rotation beyond this position will again cause a rise in signal strength. The circuit elements again function to cause motor 14 to again reverse.

The antenna 12 is thus made to oscillate continuously about the position of its minimum response because of the repeated reversals in direction of rotation produced by the increasing signal strength invariably encountered as rotation takes place away from the position of minimum response.

The second mode of operation is obtained when switch 54 is connected to point 58. In this case a decreasing signal strength is required to produce an increasing voltage for application to the trigger circuits.

It is thus evident that in this mode of operation repeated reversals of the motor 14 occur as the antenna 12 is repeatedly rotated in directions which produce decreasing signal strengths. This can only occur about a position of maximum response of the antenna 12.

When the antenna 12 is oscillating about a position of minimum response accurate determination of the direction of arrival of a radio signal may be determined. The great and rapid fluctuations in signal strength will however interfere with the audible reception of signals.

When the antenna 12 is oscillating about a position of maximum response, there is very little disturbance of the audible reception of signals but the determination of the direction of arrival of the radio signals can be done with less accuracy than when operating about a point of minimum response.

It is obvious from the foregoing that every rise in the tripping potential will result in a motor reversal. This rise occurs through an increased application of voltage to the tube 70, which increased voltage occurs either with switch 54 connected to the plate side of resistor 42 or the cathode side thereof. When the switch 54 is connected to the plate side of resistor 42, an increase in signal strength will occur just as the antenna rotates past the null. Under these conditions the antenna 12 will continuously oscillate a few degrees each side of the null. This oscillation need only be a few degrees and under these conditions antenna 12 is operating about a position where the rate of change of signal is highest and is, therefore, most directive. The absolute value of the signal, however, is low and the rapid fluctuation of this signal and relatively high background of noise makes this mode of operation unsatisfactory for aural reception. In order to get a good aural reception the swing beyond the point of maximum reception occurring with switch 54 in contact with point 58, should be held to a mimimum. This may be limited to about 30 degrees without great difficulty. At this swing the aural output is approximately 87% of that at maximum. This drop in signal strength will not be noticed by the operator. The triggering impulse may be made greater for this mode of operation by making resistor 42 several times as great as resistor 44. It should also be noticed that the rate of change about the maximum is less than that about the null, so the noise filter condensers 40, 48, 78 and 76 will have less effect on the impulse. For the same reason the series condenser will have a greater effect. A limited change in the sensitivity of the two modes of operation may be secured, therefore, by selecting a value for the condenser 64 to give desired oscillations about the maximum and selecting condensers 40, 44, 76 and 78 to give desired oscillations about the minimum. This is in addition to the variations secured by selection of predetermined values for resistors 42 and 44. In selecting a value for the resistor 42, consideration must be usually given as to whether or not an automatic volume control is to be used. The magnitude and delay of such automatic volume control will determine the value of the resistance 42. If an automatic volume control is used, it is essential that the filter condensers associated therewith be large enough to insure that the volume control voltage changes at a slower rate than the rate of change in the triggering impulse, otherwise, it would tend to eliminate such impulses. Other contacts on the switch 54 may well be added, for instance the provision of means to disable the automatic volume control during the aural reception to provide easier tuning of the receiver. Likewise, when this device is operated as a direction finder, it is desirable to disable the aduio circuits to prevent signal fluctuations and noises from disturbing the operator.

Having thus described the invention, what is claimed as new and desired to be sceured by Letters Patent is:

1. A radio direction finder comprising a rotatable directional antenna; means connected to the antenna for receiving a signal therefrom, said means including an amplifier and means to rectify the carrier frequency voltage of said signal; electrically operable means for rotating the antenna in either direction to produce a change in amplitude in the incoming signal; and circuit elements responsive to the rate of said change in amplitude and actuated by the rectified carrier frequency voltage for reversing the direction of travel of said antenna rotating means as the amplitude of the received signal changes.

2. A radio direction finder comprising a rotatable directional antenna; means connected to the antenna for receiving a signal therefrom, said means including an amplifier and means to rectify the carrier frequency voltage of said signal; electrically operable means for rotating the antenna in either direction to produce a change in amplitude in the incoming signal; circuit elements responsive to the rate of said change in amplitude and actuated by the rectified carrier frequency voltage for reversing the direction of travel of said antenna rotating means as the amplitude of the received signal changes; and means including manually manipulable parts for selectively rendering said circuit elements operable through either an increase or decrease in signal amplitude.

3. A radio direction finder comprising a rotatable directional antenna; means connected to the antenna for receiving a signal therefrom, said means including an amplifier and means to rectify the carrier frequency voltage of said signal; electrically operable means for rotating the antenna in either direction to produce a change in amplitude in the incoming signal; circuit elements responsive to the rate of said change in amplitude and actuated by the rectified carrier frequency voltage for reversing the direction of travel of said antenna rotating means as the amplitude of the received signal changes; and means including manually manipulable parts for selectively rendering said circuit elements operable through either an increase or decrease in signal amplitude, said manually manipulable parts being movable to and from one position for subjecting the circuit elements to an increased voltage as the signal amplitude increases and movable to and from a second position for subjecting the circuit elements to an increased voltage as the signal amplitude decreases.

4. A radio direction finder comprising a rotatable directional antenna; means connected to the antenna for receiving a signal therefrom, said means including an amplifier and means to rectify the carrier frequency voltage of said signal; electrically operable means for rotating the antenna in either direction to produce a change in amplitude in the incoming signal; circuit elements responsive to the rate of said change in amplitude and actuated by the rectified carrier frequency voltage for reversing the direction of travel of said antenna rotating means as the amplitude of the received signal changes, said circuit elements comprising at least one triggering assembly provided with a pair of vacuum tubes, each having a grid and a plate electrode; and means for connecting the grid electrodes of each tube to the plate electrodes of opposite tubes whereby subjection of current to the plate electrode of one tube holds the current of the plate electrode of the other tube extinguished.

5. A radio direction finder comprising a rotatable directional antenna; means connected to the antenna for receiving a signal therefrom, said means including an amplifier and means to rectify the carrier frequency voltage of said signal; electrically operable means for rotating the antenna in either direction to produce a change in amplitude in the incoming signal; circuit elements responsive to the rate of said change in amplitude and actuated by the rectified carrier frequency voltage for reversing the direction of travel of said antenna rotating means as the amplitude of the received signal changes, said circuit elements comprising at least one triggering assembly provided with a pair of vacuum tubes, each having a grid and a plate electrode; and means for interconnecting said tubes for alternately establishing a higher potential on the plate electrode of one tube than on the plate electrode of the other tube as the tubes are alternately conducting and extinguished respectively.

6. A radio direction finder comprising a rotatable directional antenna; means connected to the antenna for receiving a signal therefrom, said means including an amplifier and means to rectify the carrier frequency voltage of said signal; electrically operable means for rotating the antenna in either direction to produce a change in amplitude in the incoming signal; and circuit elements responsive to the rate of said change in amplitude and actuated by the rectified carrier frequency voltage for reversing the direction of travel of said antenna rotating means as the amplitude of the received signal changes, said circuit elements comprising a plurality of triggering assemblies, each having a number of vacuum tubes so interconnected as to cause alternate conduction in each two of said tubes as changing carrier voltage is applied thereto.

7. In a radio direction finder of the kind described, a rotatable antenna structure; automatic means for rotating said structure in either of two directions; an electric circuit connected with said structure for receiving signals therefrom; and circuit elements operably connected with said electric circuit and said automatic means and responsive to the rate of change in amplitude in said signals for reversing the direction of rotation of said structure.

8. In a radio direction finder of the kind described, a rotatable antenna structure; automatic means for rotating said structure in either of two directions; an electric circuit connected with said structure for receiving signals therefrom; circuit elements operably connected with said electric circuit and said automatic means and responsive to the rate of change in amplitude in said signals for reversing the direction of rotation of said structure; and means for rendering said circuit elements operable only upon application of an increasing voltage thereto.

9. In a radio direction finder of the kind described, a rotatable antenna structure; automatic means for rotating said structure in either of two directions; an electric circuit connected with said structure for receiving signals therefrom; circuit elements operably connected with said electric circuit and said automatic means and responsive to the rate of change in amplitude in said signals for reversing the direction of rotation of said structure; and electrical apparatus interposed in said electrical circuit for rendering said elements operable only upon an increase in amplitude of said signal.

10. In a radio direction finder of the kind described, a rotatable antenna structure; automatic means for rotating said structure in either of two directions; an electric circuit connected with said structure for receiving signals therefrom; circuit elements operably connected with said electric circuit and said automatic means and responsive to the rate of change in amplitude in said signals for reversing the direction of rotation of said structure; and electrical apparatus interposed in said electrical circuit for rendering said elements operable only upon a decrease in amplitude of said signal.

11. In a radio direction finder of the kind described, a rotatable antenna structure; automatic means for rotating said structure in either of two directions; an electric circuit connected with said structure for receiving signals therefrom; circuit elements operably connected with said electric circuit and said automatic means and responsive to the rate of change in amplitude in said signals for reversing the direction of rotation of said structure; means for rendering said circuit elements operable only upon application of an increasing voltage thereto; and structure including manually manipulable parts for applying increased voltage to said elements during either an increase or decrease in amplitude of said signals.

12. In a radio direction finder of the kind described, a rotatable antenna structure; automatic means for rotating said structure in either of two directions; an electric circuit connected with said structure for receiving signals therefrom; circuit elements operably connected with said electric circuit and said automatic means and responsive to the rate of change in amplitude in said signals for reversing the direction of rotation of said structure; and means interposed in said electric circuit for attenuating audio voltages forming a part of said signals.

13. In a radio direction finder of the kind described, a rotatable antenna structure; automatic means for rotating said structure in either of two directions; an electric circuit connected with said structure for receiving signals therefrom; and circuit elements operably connected with said electric circuit and said automatic means and responsive to the rate of change in amplitude in said signals for reversing the direction of rotation of said structure, said elements including at least one triggering circuit having a pair of vacuum tubes and means for alternately holding the plate current of one of said tubes extinguished and the plate current of the other tube at saturation.

14. In a radio direction finder of the kind described, a rotatable antenna structure; automatic means for rotating said structure in either of two directions; an electric circuit connected with said structure for receiving signals therefrom; and circuit elements operably connected with said electric circuit and said automatic means and responsive to the rate of change in amplitude in said signals for reversing the direction of rotation of said structure, said elements including a first triggering circuit having a pair of vacuum tubes, and a second triggering circuit operably to actuate said automatic means upon firing of said first triggering circuit.

JOSEPH G. SPEER.

REFERENCES CITED

The following references are of record in the file of this patent:

UNITED STATES PATENTS

| Number | Name | Date |
|---|---|---|
| 1,915,328 | Mirick | June 27, 1933 |
| 2,138,966 | Hafner | Dec. 5, 1938 |
| 2,257,757 | Moseley | Oct. 7, 1941 |
| 2,276,235 | Lamb | Mar. 10, 1942 |
| 2,356,922 | Eltgroth | Aug. 29, 1944 |
| 2,368,921 | Green et al. | Feb. 6, 1945 |
| 2,423,337 | Moseley | July 1, 1947 |